(12) United States Patent
Fliearman et al.

(10) Patent No.: US 10,591,025 B2
(45) Date of Patent: Mar. 17, 2020

(54) INTEGRATED STARTER-GENERATOR DEVICE WITH POWER TRANSMISSION

(71) Applicant: Deere & Company, Moline, IL (US)

(72) Inventors: Steven R. Fliearman, Coffeyville, KS (US); Christopher D. Turner, Waterloo, IA (US); John N. Oenick, Bettendorf, IA (US); Tony J. Huegerich, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 15/834,356

(22) Filed: Dec. 7, 2017

(65) Prior Publication Data
US 2018/0100564 A1    Apr. 12, 2018

Related U.S. Application Data

(63) Continuation-in-part of application No. 15/056,767, filed on Feb. 29, 2016, now Pat. No. 10,487,918.

(51) Int. Cl.
*F16H 3/54* (2006.01)
*F02N 15/02* (2006.01)
(Continued)

(52) U.S. Cl.
CPC ........... *F16H 3/54* (2013.01); *F02N 11/0851* (2013.01); *F02N 15/022* (2013.01); *F16H 3/005* (2013.01);
(Continued)

(58) Field of Classification Search
CPC .... F02N 11/0851; F02N 15/022; F16H 3/005; F16H 3/54; F16H 2200/2005; F16H 2200/2069; F16H 2200/2084
See application file for complete search history.

(56) References Cited

U.S. PATENT DOCUMENTS 3,062,073 A    11/1962  Brass
3,150,544 A    9/1964   Brass
(Continued)

FOREIGN PATENT DOCUMENTS

DE    19927521 A1    6/2000
DE    19911924 A1 *  9/2000    .............. F02B 67/00
(Continued)

OTHER PUBLICATIONS

Ioan-Adrian Viorel et al., Integrated Starter-Generators for Automotive Applications, Technical University of Cluj-Romania, Dept. of Electrical Machines, vol. 45, No. 3, 2004.
(Continued)

*Primary Examiner* — Zakaria Elahmadi
(74) *Attorney, Agent, or Firm* — Klintworth & Rozenblat IP LLP

(57) ABSTRACT

A combination engine starter and electric power generator device for a work vehicle has an electric machine and a gear set mounted to the electric machine. The gear set is configured to receive rotational input from the electric machine and from the work vehicle engine. The gear set mechanically couples the electric machine and the engine in first and second power flow directions in which in the first power flow direction the gear set effects a first gear ratio and in the second power flow direction the gear set effects a second gear ratio.

14 Claims, 7 Drawing Sheets

(51) Int. Cl.
*F16H 3/00* (2006.01)
*F02N 11/08* (2006.01)
*F02N 11/04* (2006.01)
*F02N 15/04* (2006.01)

(52) U.S. Cl.
CPC ......... *B60Y 2200/221* (2013.01); *F02N 11/04* (2013.01); *F02N 15/046* (2013.01); *F16H 2200/0034* (2013.01); *F16H 2200/2005* (2013.01); *F16H 2200/2069* (2013.01); *F16H 2200/2084* (2013.01)

(56) References Cited

U.S. PATENT DOCUMENTS

| | | | |
|---|---|---|---|
| 4,862,009 A * | 8/1989 | King | F02N 11/04 290/22 |
| 4,926,713 A * | 5/1990 | Madill | F16H 3/54 475/146 |
| 5,033,994 A | 7/1991 | Wu | |
| 5,856,709 A | 1/1999 | Ibaraki | |
| 6,409,622 B1 | 6/2002 | Bolz et al. | |
| 6,484,596 B2 | 11/2002 | Puchas | |
| 6,832,970 B2 * | 12/2004 | Eibler | F02N 11/04 475/175 |
| 7,503,871 B2 | 3/2009 | Kozarekar et al. | |
| 7,780,562 B2 * | 8/2010 | King | B60K 6/26 475/5 |
| 8,226,517 B2 * | 7/2012 | Tsai | B62M 6/65 475/149 |
| 8,235,859 B2 * | 8/2012 | Yun | B62M 11/06 475/290 |
| 8,734,281 B2 * | 5/2014 | Ai | B60K 6/445 180/65.21 |
| 9,145,136 B2 * | 9/2015 | Suntharalingam | B60K 6/365 |
| 9,261,064 B2 * | 2/2016 | Patel | F02N 11/04 |
| 9,371,813 B2 * | 6/2016 | Creviston | F02N 15/043 |
| 9,421,855 B2 * | 8/2016 | Suntharalingam | B60K 6/387 |
| 9,541,172 B1 * | 1/2017 | Wright | F16H 3/666 |
| 2002/0033059 A1 | 3/2002 | Pels et al. | |
| 2002/0177504 A1 | 11/2002 | Pels et al. | |
| 2003/0001391 A1 * | 1/2003 | Kuang | B60L 11/123 290/400 |
| 2003/0104900 A1 | 6/2003 | Takahashi | |
| 2003/0224888 A1 * | 12/2003 | Wilder | H02K 7/1008 474/114 |
| 2004/0116226 A1 * | 6/2004 | Baker | B60K 6/365 475/5 |
| 2007/0157899 A1 * | 7/2007 | Seufert | B60K 6/387 123/179.25 |
| 2007/0265126 A1 * | 11/2007 | Janson | B60K 6/387 475/5 |
| 2008/0179119 A1 | 7/2008 | Grenn et al. | |
| 2009/0055061 A1 | 2/2009 | Zhu | |
| 2010/0029428 A1 * | 2/2010 | Abe | B60K 6/365 475/5 |
| 2010/0063704 A1 * | 3/2010 | Okubo | B60K 6/365 701/99 |
| 2010/0076634 A1 * | 3/2010 | Brigham | B60K 6/485 701/22 |
| 2011/0010031 A1 * | 1/2011 | Syed | B60K 6/445 701/22 |
| 2011/0053729 A1 | 3/2011 | Parsons et al. | |
| 2011/0070999 A1 * | 3/2011 | Soliman | B60W 10/026 477/3 |
| 2011/0263379 A1 * | 10/2011 | Liang | B60K 6/44 477/5 |
| 2012/0103293 A1 | 5/2012 | Robinette et al. | |
| 2012/0235473 A1 | 9/2012 | Jiang et al. | |
| 2012/0240723 A1 | 9/2012 | Gluckler et al. | |
| 2013/0046427 A1 * | 2/2013 | Hohenberg | B60K 6/365 701/22 |
| 2013/0252773 A1 | 9/2013 | Suntharalingam | |
| 2013/0316873 A1 | 11/2013 | Jansen et al. | |
| 2014/0137824 A1 | 5/2014 | Jacques et al. | |
| 2014/0150604 A1 | 6/2014 | Kaltenbach | |
| 2014/0256490 A1 | 9/2014 | Honda | |
| 2015/0239335 A1 | 8/2015 | Wachter | |
| 2016/0031438 A1 | 2/2016 | Matsui et al. | |
| 2016/0052382 A1 | 2/2016 | Clark et al. | |
| 2016/0076629 A1 | 3/2016 | Modrzejewski et al. | |
| 2016/0082821 A1 | 3/2016 | Mueller et al. | |
| 2016/0137045 A1 | 5/2016 | Zhu et al. | |
| 2016/0288780 A1 | 10/2016 | Shukla | |
| 2017/0248196 A1 | 8/2017 | Turner et al. | |
| 2018/0106365 A1 | 4/2018 | Tsukizaki et al. | |
| 2018/0186230 A1 | 7/2018 | Fukuda et al. | |
| 2018/0236864 A1 | 8/2018 | Imamura et al. | |
| 2019/0160936 A1 | 5/2019 | Lubben | |
| 2019/0219022 A1 | 7/2019 | Patil et al. | |

FOREIGN PATENT DOCUMENTS

| | | |
|---|---|---|
| DE | 19911924 A1 | 9/2000 |
| DE | 19923316 A1 | 11/2000 |
| DE | 102006037576 A1 | 4/2008 |
| DE | 102010030570 A1 | 12/2011 |
| DE | 102010030571 A1 | 12/2011 |
| DE | 102010060140 A1 | 4/2012 |
| DE | 102011080068 A1 | 1/2013 |
| DE | 102011089708 A1 | 6/2013 |
| DE | 102011089709 A1 | 6/2013 |
| DE | 102011089710 A1 | 6/2013 |
| DE | 112011103973 T5 | 10/2013 |
| DE | 102008045202 B4 | 3/2014 |
| DE | 102013203009 A1 | 8/2014 |
| DE | 102013206970 A1 | 10/2014 |
| DE | 102014200720 B3 | 2/2015 |
| DE | 102014200723 B3 | 2/2015 |
| DE | 102011089709 A1 | 6/2015 |
| DE | 102017203026 A1 | 8/2017 |
| DE | 102017204269 A1 | 9/2017 |
| EP | 1069310 A2 | 1/2001 |
| EP | 2272702 A2 | 1/2011 |
| JP | 2015116004 A | 6/2015 |
| WO | 200700107458 A2 | 9/2007 |

OTHER PUBLICATIONS

German Search Report for application No. 102018218908 dated May 27, 2019.

German Search Report for application No. 1020182214956 dated May 28, 2019.

Deere & Company, Bi-Directional Integrated Starter-Generator Device, Utility U.S. Appl. No. 16/385,784, filed Apr. 16, 2019.

Deere & Company, Multi-Mode Integrated Starter-Generator Device, Utility U.S. Appl. No. 16/385,860, filed Apr. 16, 2019.

Deere & Company, Multi-Mode Integrated Starter-Generator Device With Preloaded Clutch, Utility U.S. Appl. No. 16/385,892, filed Apr. 16, 2019.

Deere & Company, Multi-Mode Integrated Starter-Generator Device With Magnetic Cam Assembly, Utility U.S. Appl. No. 16/385,934, filed Apr. 16, 2019.

Deere & Company, Multi-Mode Integrated Starter-Generator Device With Cam Arrangement, Utility U.S. Appl. No. 16/385,964, filed Apr. 16, 2019.

Deere & Company, Multi-Mode Integrated Starter-Generator Device With Dog Clutch Arrangement, Utility U.S. Appl. No. 16/385,989, filed Apr. 16, 2019.

Deere & Company, Multi-Mode Starter-Generator Device Transmission With Single Valve Control, Utility U.S. Appl. No. 16/386,001, filed Apr. 16, 2019.

Deere & Company, Multi-Mode Integrated Starter-Generator Device With Electromagnetic Actuation Assembly, Utility U.S. Appl. No. 16/386,020, filed Apr. 16, 2019.

Deere & Company, Multi-Mode Integrated Starter-Generator Device With Transmission Assembly Mounting Arrangement, Utility U.S. Appl. No. 16/386,052, filed Apr. 16, 2019.

(56) References Cited

OTHER PUBLICATIONS

Deere & Company, Multi-Mode Integrated Starter-Generator Device With Solenoid Cam Actuation Apparatus, Utility U.S. Appl. No. 16/386,075, filed Apr. 16, 2019.
North Atalantic Starter, Starter Drives Explained, Northatlan.com, 2005.
USPTO Non-Final Office Action dated Nov. 2, 2017 for Utility U.S. Appl. No. 15/056,767.
USPTO Non-Final Office Action dated Nov. 1, 2018 for Utility U.S. Appl. No. 15/825,520.
German Search Report for application No. 1020182180784 dated Jun. 4, 2019.
USPTO Non-Final Office Action dated Sep. 28, 2018 for Utility U.S. Appl. No. 15/056,767.
USPTO Final Office Action dated Jun. 11, 2018 for Utility U.S. Appl. No. 15/056,767.
USPTO Final Office Action dated Mar. 8, 2019 for Utility U.S. Appl. No. 15/056,767.
Harmonic Drive LLC, Harmonic Planetary Precision Gearing & Motion Control, Product Brochure, Mar. 2006.
NTN Automotive Sales Headquarters, Compact Clutch Integrated Pulley for Alternators, NTN Technical Review No. 75, 2007.
German Patent and Trade Mark Office, Search Report in German Patent Application No. 10 2017 203 026.7 dated Aug. 4, 2017.
European Patent and Trade Mark Office, Search Report in European Patent Application No. 16169885.7 dated Oct. 31, 2016.

* cited by examiner

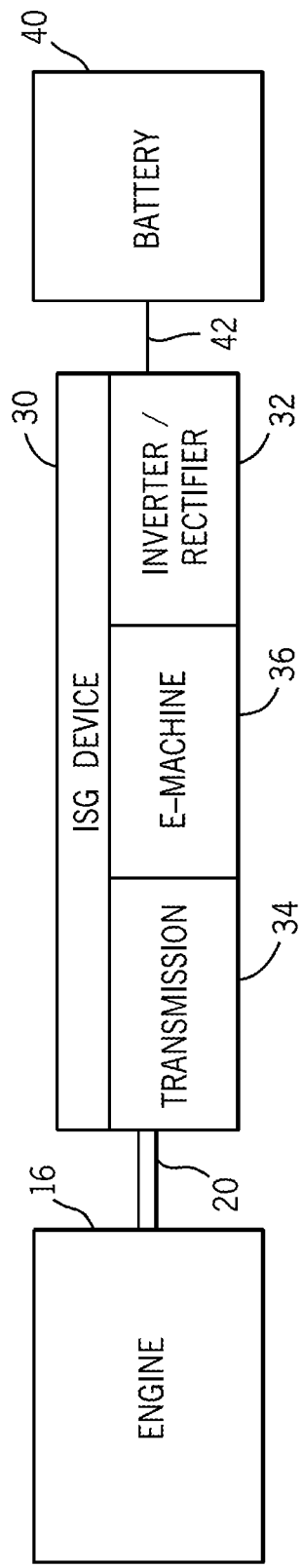
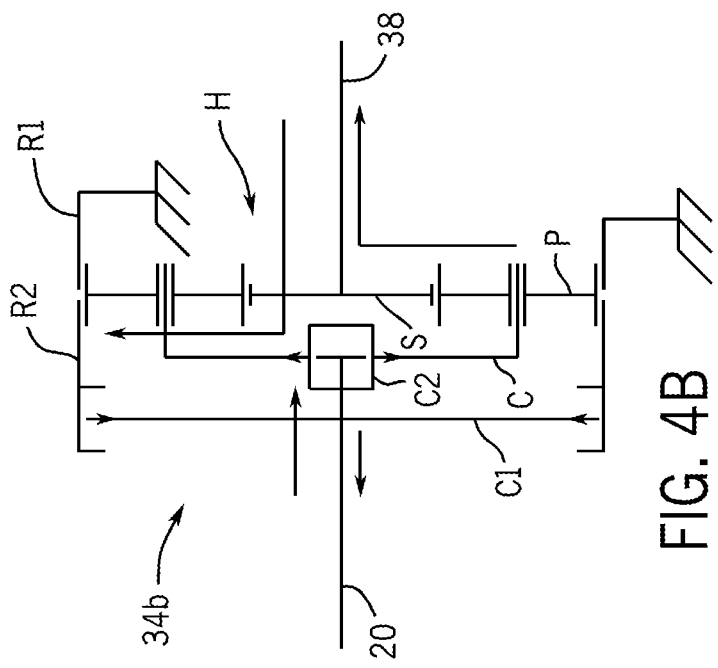
FIG. 4B
FIG. 3
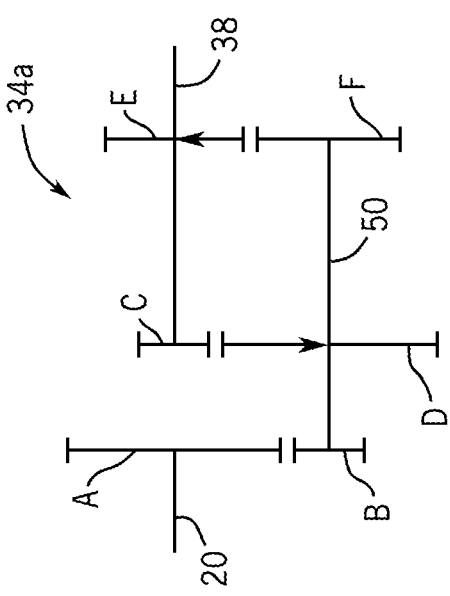
FIG. 4A

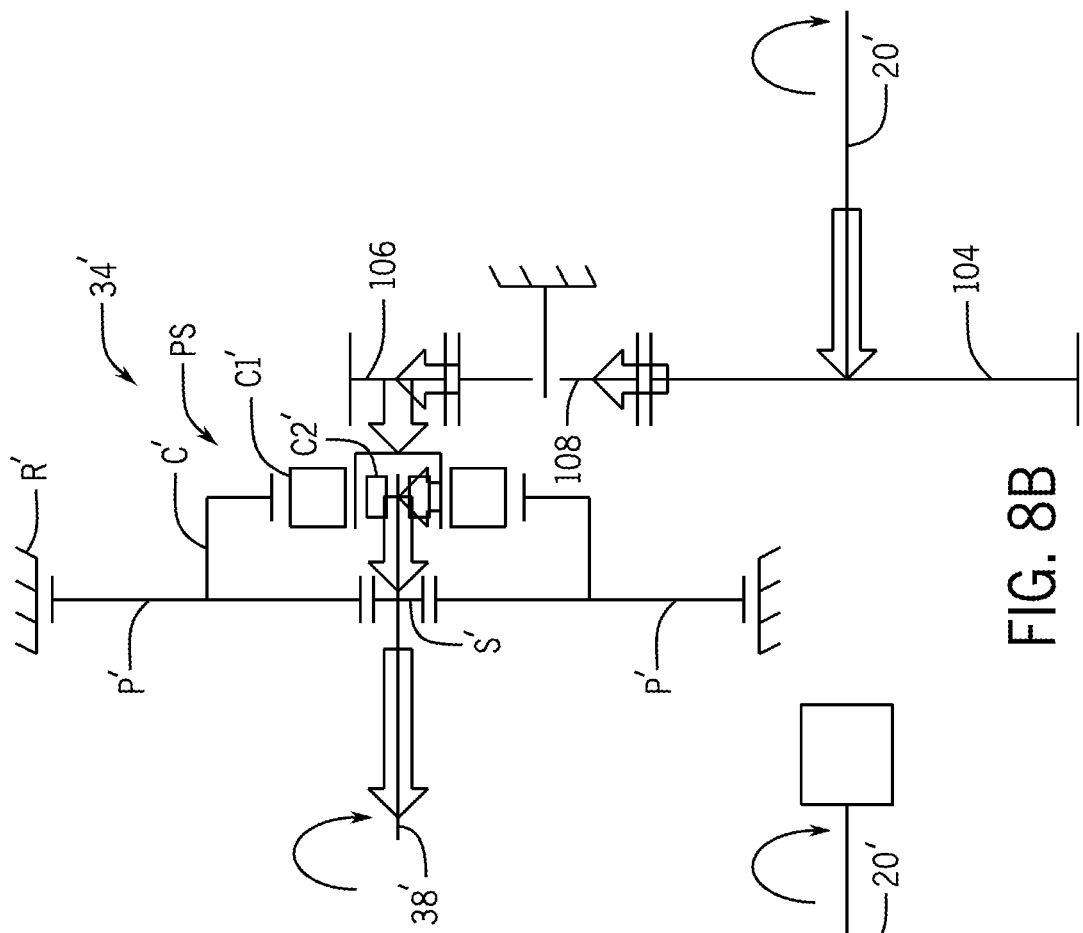
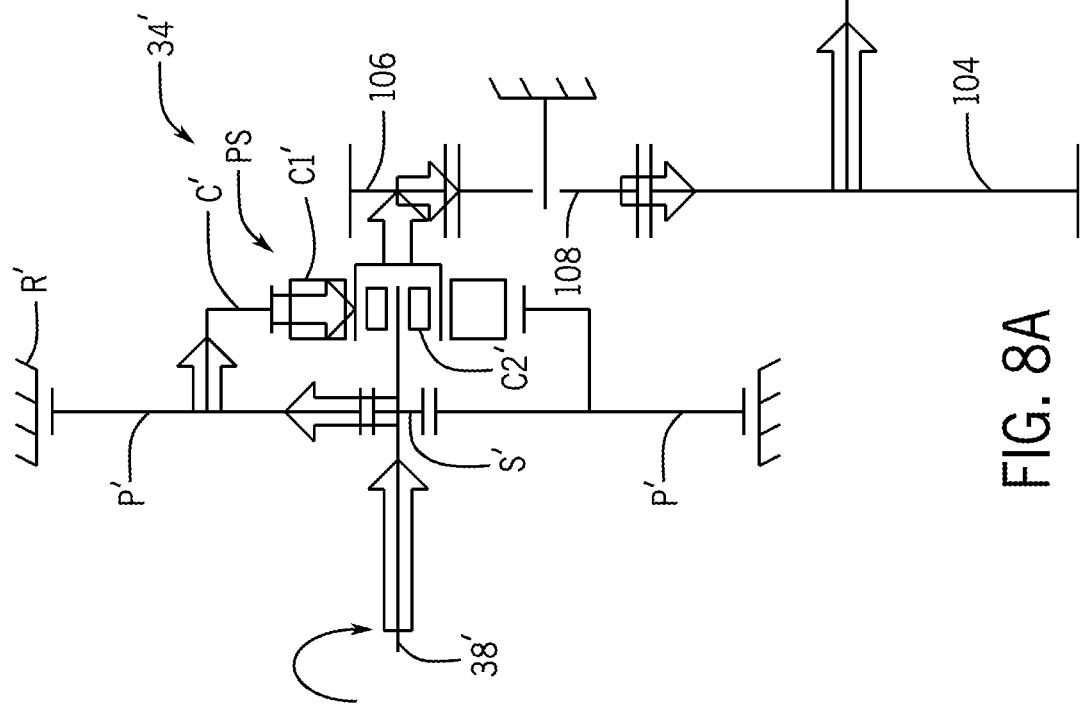

INTEGRATED STARTER-GENERATOR DEVICE WITH POWER TRANSMISSION

CROSS-REFERENCE TO RELATED APPLICATION(S)

This application is a continuation-in-part of application Ser. No. 15/056,767, filed Feb. 29, 2016.

STATEMENT OF FEDERALLY SPONSORED RESEARCH OR DEVELOPMENT

Not applicable.

FIELD OF THE DISCLOSURE

This disclosure relates to work vehicle power trains, including starting mechanical power equipment and generating electric power therefrom.

BACKGROUND OF THE DISCLOSURE

Work vehicles, such as those used in the agriculture, construction and forestry industries, and other conventional vehicles may be powered by an internal combustion engine (e.g., a diesel engine), although it is becoming more common for mixed power sources (e.g., engines and electric motors) to be employed. In any case, engines remain the primary power sources of work vehicles and require mechanical input from a starter to initiate rotation of the crankshaft, and thereby reciprocation of the pistons within the cylinders. Torque demands for cold-starting an engine are high, particularly so for large diesel engines common in heavy-duty machines.

To power electrical subsystems of the work vehicle, a portion of the engine power may be harnessed using an alternator to generate AC power. The battery or batteries of the work vehicle are charged by first inverting the current coming from the alternator. Conventionally, a belt, direct or serpentine, couples an output shaft of the engine to the alternator to generate the AC power. Torque demands for generating current from the running engine are significantly lower than for engine start-up.

SUMMARY OF THE DISCLOSURE

This disclosure provides a combined engine starter and electric power generator with an integral transmission, such as may be used in work vehicles for engine cold start and to generate electric power, thus serving the dual purposes of an engine starter and an alternator with more robust power transmission to and from the engine in both cases.

In one aspect the disclosure provides a combination engine starter and electric power generator device for a work vehicle having an engine. The device includes an electric machine and a gear set mounted to the electric machine. The device is configured to receive rotational input from the electric machine and from the engine. The device is also configured to mechanically couple the electric machine and the engine in first and second power flow directions in which in the first power flow direction the gear set effects a first gear ratio and in the second power flow direction the gear set effects a second gear ratio.

In another aspect the disclosure provides a combination engine starter and electric power generator device for a work vehicle. The device includes a housing that, at least in part, contains an electric machine and a transmission. The transmission includes a gear set and a clutch assembly mechanically coupled to the gear set. The gear set is configured to receive rotational input from the electric machine and from the engine and to mechanically couple the electric machine and the engine in first and second power flow directions in which in the first power flow direction the gear set effects a first gear ratio and in the second power flow direction the gear set effects a second gear ratio. The clutch assembly includes two one-way clutches. A first one-way clutch is engaged when the gear set moves in the first power flow direction and is disengaged when the gear set moves in the second power flow direction. A second one-way clutch is engaged when the gear set moves in the second power flow direction and is disengaged when the gear set moves in the first power flow direction.

In yet another aspect the disclosure provides a drivetrain assembly, such as a work vehicle, and a work vehicle having such drivetrain assembly. The drivetrain assembly includes an engine and a combination starter and generator device. The device includes an electric machine and a gear set mounted to the electric machine. The device is configured to receive rotational input from the electric machine and from the engine. The device is also configured to mechanically couple the electric machine and the engine in first and second power flow directions in which in the first power flow direction the gear set effects a first gear ratio and in the second power flow direction the gear set effects a second gear ratio.

The details of one or more embodiments are set forth in the accompanying drawings and the description below. Other features and advantages will become apparent from the description, the drawings, and the claims.

BRIEF DESCRIPTION OF THE DRAWINGS

FIG. 3 is a block diagram of a portion of a powertrain of the work vehicle of FIG. 1 having an example starter-generator device;

FIG. 4A is a schematic diagram of a portion of a powertrain of the work vehicle of FIG. 1 having an example starter-generator device according to this disclosure;

FIG. 4B is a schematic diagram of a portion of another example powertrain having another example starter-generator device;

FIGS. 8A-8B are schematic diagrams of a showing the power flow for the example starter-generator device of FIG. 6 in starter and generator operational states, respectively.

DETAILED DESCRIPTION

Figure 1:
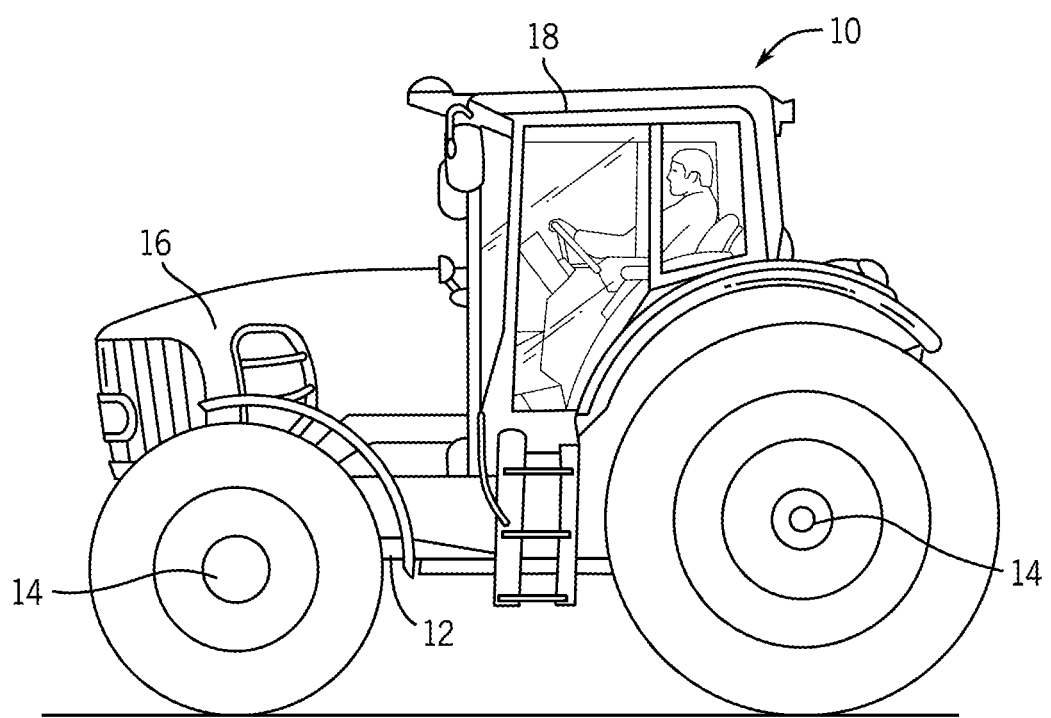
FIG. 1 is a side view of an example work vehicle in the form of an agricultural tractor in which the disclosed integrated starter-generator device may be used.

Like reference symbols in the various drawings indicate like elements.

The following describes one or more example embodiments of the disclosed starter-generator device, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Many conventional vehicle electrical systems have a chemical power source (i.e., a battery) that powers various components and subsystems of the vehicle. In certain electric vehicles, the chemical power source may be a bank of batteries that power the entire vehicle including the drive wheels to impart motion to the vehicle. In other hybrid gas and electric vehicles, the motive force may alternate between engine and electric motor power or the engine power may be supplemented by electric motor power. In still other conventional vehicles the electric system is solely used to initiate engine start up and to run the non-drive electrical systems of the vehicle. In the latter case, the vehicle typically has a starter motor that is powered by the vehicle battery to turn the engine crankshaft to move the pistons within the cylinders. Some engines (e.g., diesel engines) initiate combustion by compression of the fuel, while other engines rely on a spark generator (e.g., spark plug), which is powered by the battery. Once the engine is operating, the electrical system of conventional vehicles may harvest the engine power to power the electrical system as well as to charge the battery. Typically, this power harvesting is done using an alternator, that is, an alternating current (AC) power generator. The alternator converts the AC power to direct current (DC) power usable by the battery for charging by passing the AC power through an inverter (e.g., diode rectifier). Conventional alternators harness power from the engine by coupling a rotor of the alternator to an output shaft of the engine (or a component coupled thereto). Historically this was accomplished by the use of a dedicated belt, but in more modern vehicles the alternator is one of several devices that are coupled to (and thus powered by) the engine via a single "serpentine" belt. In either case, rotation of the engine output shaft rotates he belt to drive the rotor to turn relative to a stator of the alternator, thus generating a magnetic field that induces an alternating current in the stator, which may then be rectified by the diodes to output DC power to the battery and vehicle electrical components.

In certain applications, such as in certain heavy-duty machinery and work vehicles, it may disadvantageous to have a conventional set-up with separate starter and alternator components. Such separate components require separate housings, which may require separate sealing or shielding from the work environment, and which occupy separate spaces within the engine compartment, which may be have a relatively small space envelop relative to the numerous other components required to be located within the engine compartment. Other engine compartment layout complexities may arise as well. Further, in these and other applications, conventional alternators may introduce an undesirable, or indeed unacceptable, level of unreliability by using a belt drive.

The following describes one or more example implementations of an improved vehicle electrical system that addresses one or more of these (or other) matters with conventional systems. In one aspect, the disclosed vehicle electrical system includes a combination or integrated device that performs the engine cranking function of a conventional starter motor as well as the electric power generating function of a conventional generator or alternator. The device is referred to herein as an "integrated starter-generator" (ISG) device. This terminology is used herein, at least in some implementations of the system, to be agnostic to the type of power (i.e., AC or DC current) generated by the device. In some implementations, the ISG device may function to generator electricity in a manner of what persons of skill in the art may consider a "generator" device that produces DC current directly. However, as used herein, the term "generator" shall mean producing electric power of static or alternating polarity (i.e., AC or DC). Thus, in a special case of the ISG device the electrical power generating functionality is akin to that of a conventional alternator, in other words, it generates AC power that is subsequently rectified to DC power, either internally or externally to the ISG device.

In certain embodiments, the ISG device may include a direct mechanical power coupling to the engine that avoids the use of belts. For example, the ISG device may include within its housing a gear set that directly couples with an output gear rotated by an output shaft of the engine. The gear set may take any of various forms including arrangements with enmeshing spur or other gears as well as arrangements with one or more planetary gear sets. Large gear reduction ratios may be achieved by the transmission assembly such that a single electric machine (i.e., motor/generator) may be used and operated at suitable speeds for both the engine start up and electric power generation functions. Harmonic planetary sets, for example, may be used to achieve a deep gear reduction. The direct power coupling may increase system reliability and also improve cold starting performance and electrical power generation of the system.

Further, in certain embodiments, the ISG device may have a power transmission assembly that automatically shifts gear ratios (i.e., shifts between power flow paths having different gear ratios) according only to the direction in which torque is applied to or from the gear set. By way of example, the transmission assembly may include one or more (e.g., two) passive engagement components that engage automatically when driven in a particular direction. Suitable one-way clutches (e.g., roller or sprag clutches) may be used such that one clutch effects power transmission through a power flow path in the engine start up direction and another clutch effects power transmission through another power flow path in the electric power generation direction. Thus, no electronic or other controls are required for the starter-generator to switch between operating as a starter or generator (or alternator). However, bi-directional or other active clutch (or other) configurations may be employed to carry out the cranking and generating functions with the appropriate control hardware.

Referring to the drawings, an example work vehicle electrical system will be described in detail. As will become apparent from the discussion herein, the disclosed system may be used advantageously in a variety of settings and with a variety of machinery. For example, referring now to FIG.

1, the system may be included in a work vehicle 10, which is depicted as an agricultural tractor. It will be understood, however, that other configurations may be possible, including configurations with work vehicle 10 as a different kind of tractor, or as a work vehicle used for other aspects of the agriculture industry or for the construction and forestry industries (e.g., a harvester, a log skidder, a motor grader, and so on). It will further be understood that the disclosed stair assembly may also be used in non-work vehicles and non-vehicle applications (e.g., fixed-location installations).

As is known, the work vehicle 10 has a main frame or chassis 12 supported off the ground by ground-engaging wheels 14, at least the front wheels of which are steerable. The chassis 12 supports a power plant (e.g., internal combustion engine 16), a transmission (not shown), and an operator cabin 18 perched up from the middle to rear of the machine in which are stationed operator interface and controls (e.g., various joysticks, switches levers, buttons, touchscreens, keyboards, speakers and microphones associated with a speech recognition system).

Figure 2:
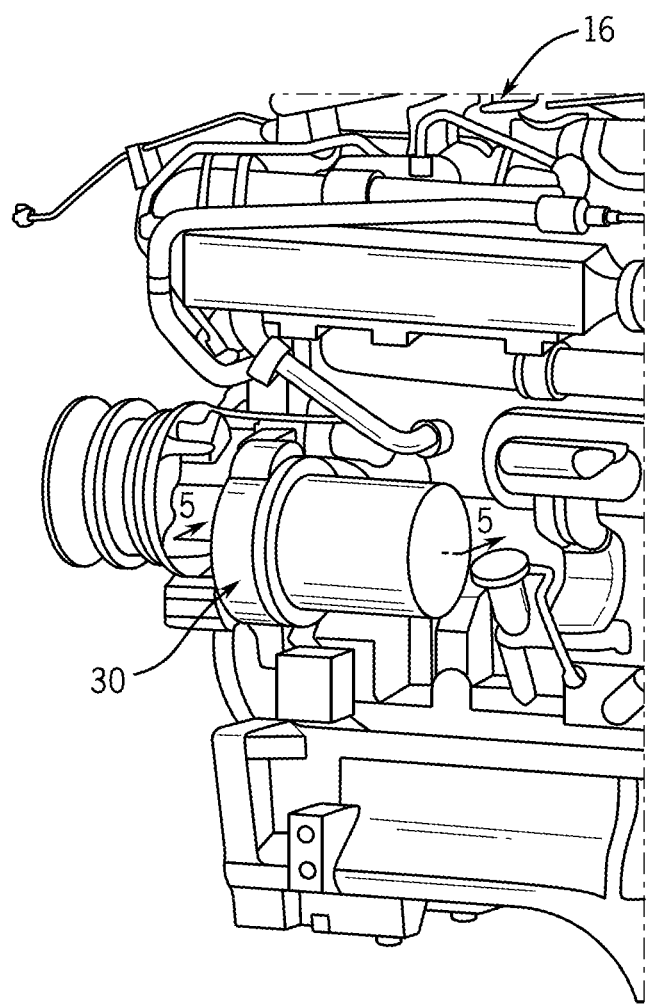
FIG. 2 is a simplified partial isometric view of an engine of the work vehicle of FIG. 1 showing an example mounting location for an example starter-generator device (also shown simplified)

The engine 16 sits within an engine compartment of the work vehicle 10 and an integrated starter-generator (ISG) device 30 mounts directly and compactly to the engine 16, for example, as shown schematically in FIG. 2, so as not to project significantly from the engine (and thereby enlarge the engine compartment space envelope) or interfere with various plumbing lines and access points (e.g., oil tubes and fill opening and the like). Notably, the ISG device 30 may be mounted at a side of the engine other than where the serpentine (or other) belt is located. Taking the ISG device 30 out of the belt pathway reduces the complexity of the engine layout and allows for more compact packaging. The ISG device 30 may generally mounted on or near the engine 16 in a location suitable for coupling to an engine output shaft (e.g., an auxiliary drive shaft 20 (see FIG. 5)).

Referring now to FIG. 3, an example vehicle electrical system in which an ISG device 30 may be incorporated is illustrated schematically in functional blocks. Generally, the engine 16 couples mechanically to the ISG device 30, which is electrically coupled to a battery 40. Although shown as a single battery, it will be understood that the work vehicle 10 may include a number of batteries operatively coupled to one another (e.g., four 12 VDC batteries comprising a 48 VDC electrical system). Although not shown, the system may also include a suitable voltage regulator, either incorporated into the ISG device 30 or as a separate component. The ISG device 30 is configured to convert electrical power from the battery 40 into mechanical power to the engine 16 during engine start up, and to convert mechanical power from the engine 16 into electrical power to the battery 40 during electrical power generation. As noted, the ISG device 30 may be configured to automatically switch between engine cranking and power generating modes according to the direction of power flow (i.e., either toward or away from the engine 16).

Generally, the ISG device 30 interfaces with the battery 40 via direct hardwiring or a vehicle power bus 42 through an inverter/rectifier (I/R) device 32 (e.g., a suitable diode arrangement). As is understood in the art, the I/R device 32 inverts DC power from the battery 40 into AC power during engine start up direction and rectifies AC power to DC power in the power generation direction. The I/R device 32 may be a separate component, rather than being incorporated into the ISG device 30, as shown. The ISG device 30 interfaces with the engine 16 via the auxiliary drive shaft 20 through a transmission assembly 34, which may be incorporated directly into the ISG device 30, as shown. The transmission assembly 34 may include gear sets in various configurations to provide the necessary power flow and gear reduction, as will be described. The transmission assembly 34 interfaces with an electric machine 36 that operates as a motor during engine start up and as a generator during power generation. Multiple gear ratios are provided by the transmission assembly 34 to permit the electric machine 36 to operate within optimal speed and torque ranges in both power flow directions.

As noted, the gearing and other components of the transmission assembly 34 may vary. FIGS. 4A and 4B illustrate schematically two example transmission assemblies 34a and 34b, respectively. The FIG. 4A transmission assembly 34a generally includes conventional toothed gear sets, and the FIG. 4B transmission assembly 34b includes a planetary gear set. In both cases, the gear sets are coupled with torque application components (e.g., clutches) that engage to transfer torque between the gear sets and the input/output shafts of the engine 16 and the electric machine 36. In the illustrated examples, the transmission assemblies 34a, 34b each include two clutches C1 and C2. Moreover, in the illustrated examples, the clutches C1 and C2 are each passive components that do not require active control in order to energize. The clutches C1 and C2 are configured as one-way clutches such that they automatically engage in the direction in which power flows. Put another way, rather than external control hardware, the ISG device 30 controls the clutches C1 and C2 internally by operation of the electric machine 36, to wit, operation in one rotational direction engages C1 (and disengages C2) and vice versa with operation of the electric machine 36 in the opposite rotational direction. Any of various known clutch configurations may be used, including, for example, roller clutches, sprag clutches, wedge clutches, and mechanical diodes. Other clutch configurations may also be used. Furthermore, while the system benefits from the use of passive, one-way clutches in that external active control hardware and software may be eliminated, the principles of this disclosure may apply to actively controlled torque application components (e.g., bi-directional and other clutches), and such clutches and control hardware and software may be incorporated into the system, and specifically into the ISG device 30.

Referring first to FIG. 4A, the example transmission assembly 34a includes gears A-F and over-running (one-way) clutches C1 and C2. The gear A is coupled to the engine auxiliary drive shaft 20, and the gears C and E are coupled to a shaft 38 of the electric machine 36. The gears B, D and F may be mounted to a countershaft 50 such that the gear B engages the gear A and the gears D and F engage the respective gears C and E depending on the state of engagement of the clutches C1 and C2, respectively. The gear set and the clutches C1 and C2 thus provide a direct mechanical connection between the engine 16 and the electric machine 36 in both power flow directions.

The power flow for engine start up is as follows. With the engine 16 inactive or stopped, activation of the ignition by an operator in the cabin 18 of the work vehicle 10 energizes the electric machine 36, which operates as a motor, to rotate the shaft 38 and drive the gear C. In this power flow direction, the clutch C1 is engaged to couple the gear D to the gear C. Rotation of the gear D rotates the countershaft 50 and the gear B, which engages and rotates the gear A, which is coupled to the engine 16 by the auxiliary drive shaft 20. Rotation of the gear D and the countershaft 50 rotates the gear F, which drives the gear E. However, it idles slower than the electric machine shaft 38, which keeps the clutch C2 disengaged.

Power flow transition from engine start up to power generation for the example transmission assembly 34a is as follows. As the engine 16 begins to fire and accelerates above starting speed, the clutch C1 disengages. At this point, both of the clutches C1 and C2 are disengaged. After the engine 16 stabilizes at an idle speed or above, the electric machine 36 is allowed to slow down. The gear ratio of the gear F to the gear E is 1:1 such that once the electric machine 36 decelerates below the speed of the countershaft 50, the clutch C2 engages to drive the electric machine 36 to operate as a generator. Specifically, the engine 16 rotates the auxiliary drive shaft 20 to rotate the gear A, which drives the gear B, which rotates the countershaft 50 to rotate the gear F. With the clutch C2 engaged, the gear F drives the gear E to rotate the shaft 38 of the electric machine 36. As the gear E and the shaft 38 rotate, the gear C rotates. However, it idles slower than the countershaft 50, keeping the clutch C1 disengaged.

In one non-limiting example, the starting load characteristics of certain embodiments of the engine 16 (e.g., a diesel engine) may have a typical operating speed in the range of about 2,000-3,000 RPM with crank (starting) speed of about 100-150 RPM and a peak starting torque of about 300 Nm. The gear set of example transmission assembly 34a may be configured to provide a starting torque ratio of the gear C to the gear D of about 10:1 and interface with the electric machine 36 at a normal operating speed (e.g., about 3,000 RPM) in both power flow directions.

Referring to FIG. 4B, the example transmission assembly 34b includes a harmonic planetary set H, with sun gear S, planet gears P, planet carrier C, and ring gears R1 and R2, as well as over-running (one-way) clutches C1 and C2. The clutch C2 is coupled to the engine auxiliary drive shaft 20, and the sun gear S is coupled to the shaft 38 of the electric machine 36. The planet gears P are rotatably mounted to the carrier C via pinion shafts (not shown) such that the planet gears P revolve with the rotation of the carrier C and rotate about the pinon shafts when driven by the sun gear S and/or engagement with the ring gears R1 and R2. The planetary set H operates in a sun-in, ring-out (via ring gear R2) configuration during starting and in a carrier-in, sun-out configuration during power generation, with the clutches C1 and C2 automatically alternating engagement and disengagement in the two power flow directions. Thus, as with the gear set of the example transmission assembly 34a, the planetary set H and the clutches C1 and C2 of the example transmission assembly 34b provide a direct mechanical connection between the engine 16 and the electric machine 36 in both power flow directions.

The power flow for engine start up is as follows. With the engine 16 inactive or stopped, activation of the ignition by an operator in the cabin 18 of the work vehicle 10 energizes the electric machine 36, which operates as a motor, to rotate the shaft 38 and drive the sun gear S. Rotation of the sun gear S drives rotation of the planet gears P and the carrier C. The ring gear R1 is fixed to ground, and rotation of the planet gears P and the carrier C rotates the ring gear R2. In this power flow direction, the clutch C1 is engaged to couple the ring gear R2 to the engine 16 by the auxiliary drive shaft 20. As mentioned, rotation of the sun gear S and the planet gears P rotates the carrier C. However, the carrier C idles slower than the electric machine shaft 38, which keeps the clutch C2 disengaged.

Power flow transition from engine start up to power generation for the example transmission assembly 34b is as follows. As the engine 16 begins to fire and accelerates above starting speed, clutch C1 disengages. At this point, both clutches C1 and C2 are disengaged. After the engine 16 stabilizes at an idle speed or above, the electric machine 36 is allowed to slow down. The planetary set H is configured such that once the electric machine 36 decelerates sufficiently, the clutch C2 engages to drive the electric machine 36 to operate as a generator. Specifically, the engine 16 rotates the auxiliary drive shaft 20 to rotate the carrier C, which drives the planet gears P to revolve and rotate, engaging both the ring gear R1 and the sun gear S, which drives the shaft 38 of the electric machine 36. As the planet gears P revolve and rotate, the ring gear R2 rotates. However, it idles slower than the carrier C, keeping clutch C1 disengaged.

As noted, the transmission assembly 34b is driven by a harmonic planetary set H by virtue of the double ring gear arrangement with each ring gear having a different tooth count. The reference to a "harmonic" planetary set will be understood by those of skill in the art as providing several advantages of conventional (non-harmonic) planetary sets, including reducing backlash, high, reconfigurable gear ratios, high torque capabilities and axially compact packaging, among other things. The example harmonic planetary set H thus provides a deep reduction ratio many times (e.g., 10 times) higher than that of the example transmission assembly 34a, and within a similar space envelope.

In the example starting load characteristics of the engine 16 mentioned above (i.e., operating speed range of about 2,000-3,000 RPM, crank speed of about 100-150 RPM, and peak starting torque of about 300 Nm), the planetary set H of example transmission assembly 34b may be configured to provide a starting torque ratio of the carrier C to the sun gear S of about 3.5-4:1 and a power generating torque ratio of the sun gear S to the ring gear R2 of about 75-95:1. These gear ratios may be effected, as one example, by the sun gear S having 30 teeth, the planet gears having 25 teeth, the ring gear R1 having 80 teeth and the ring gear R2 having 83 or 84 teeth. The electric machine 36 may thus have normal operating speeds (e.g., about 10,000 RPM) in both power flow directions with relatively high torque output for engine start up and low torque output during power generation.

Figure 5:
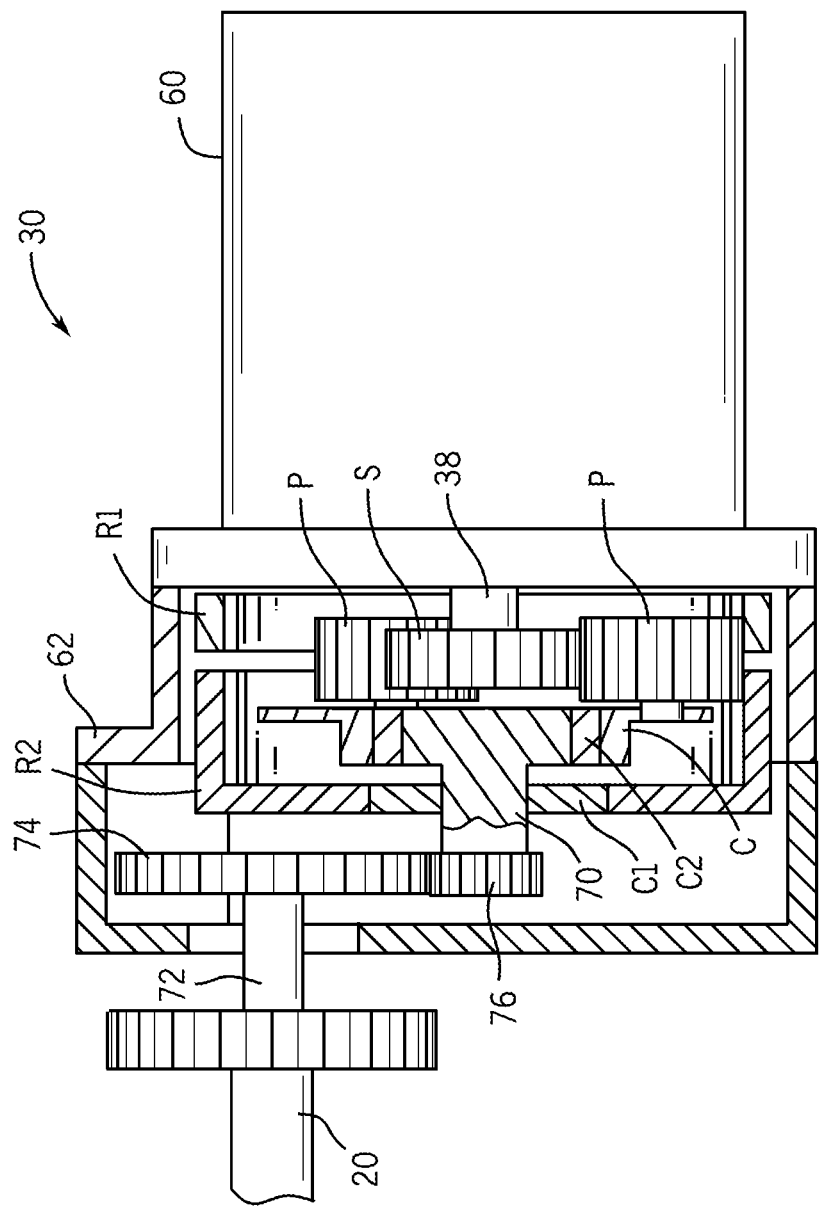
FIG. 5 is a side sectional view taken along line 5-5 of FIG. 2 showing a simplified representation of a power transmission assembly of the example starter-generator device shown in FIG. 4A.

Referring also to FIG. 5, the ISG device 30 with the example transmission assembly 34b is shown in simplified form in one example physical integration or layout configuration within a common housing, or motor casing 60 and gearbox 62 sections thereof, such that the ISG device 30 is a single component package complete with the gear set, the electric machine 36 and the I/R device 32. As detailed above, the transmission assembly 34b has a harmonic planetary set H including a sun gear S meshing with three planet gears P that revolve around the sun gear S within a planet carrier C and engage two ring gears R1 and R2. Over-running (one-way) clutch C1 is mounted within an opening in the ring gear R2, and over-running clutch C2 is mounted within an opening of the carrier C. Both clutches C1 and C2 are disposed about, and configured to engage, a stub shaft 70. The stub shaft 70 may be co-axial with the electric machine shaft 38 on which the sun gear S is mounted, and axially offset from the engine auxiliary drive shaft 20. The auxiliary drive shaft 20, or another drive shaft 72 with a drive gear 74, may be coupled to a gear 76 of the stub shaft 70. As described above, the planetary set H operates in a sun-in, ring-out (via ring gear R2) configuration during starting and in a carrier-in, sun-out configuration during power generation, with the clutches C1 and C2 automatically alternating engagement and disengagement in the two power flow directions. Thus, in a compact, unitary component package, the ISG device 30, including the example transmission assembly 34b, provides a direct mechanical interface with the engine 16 in both power flow directions.

Figure 6:
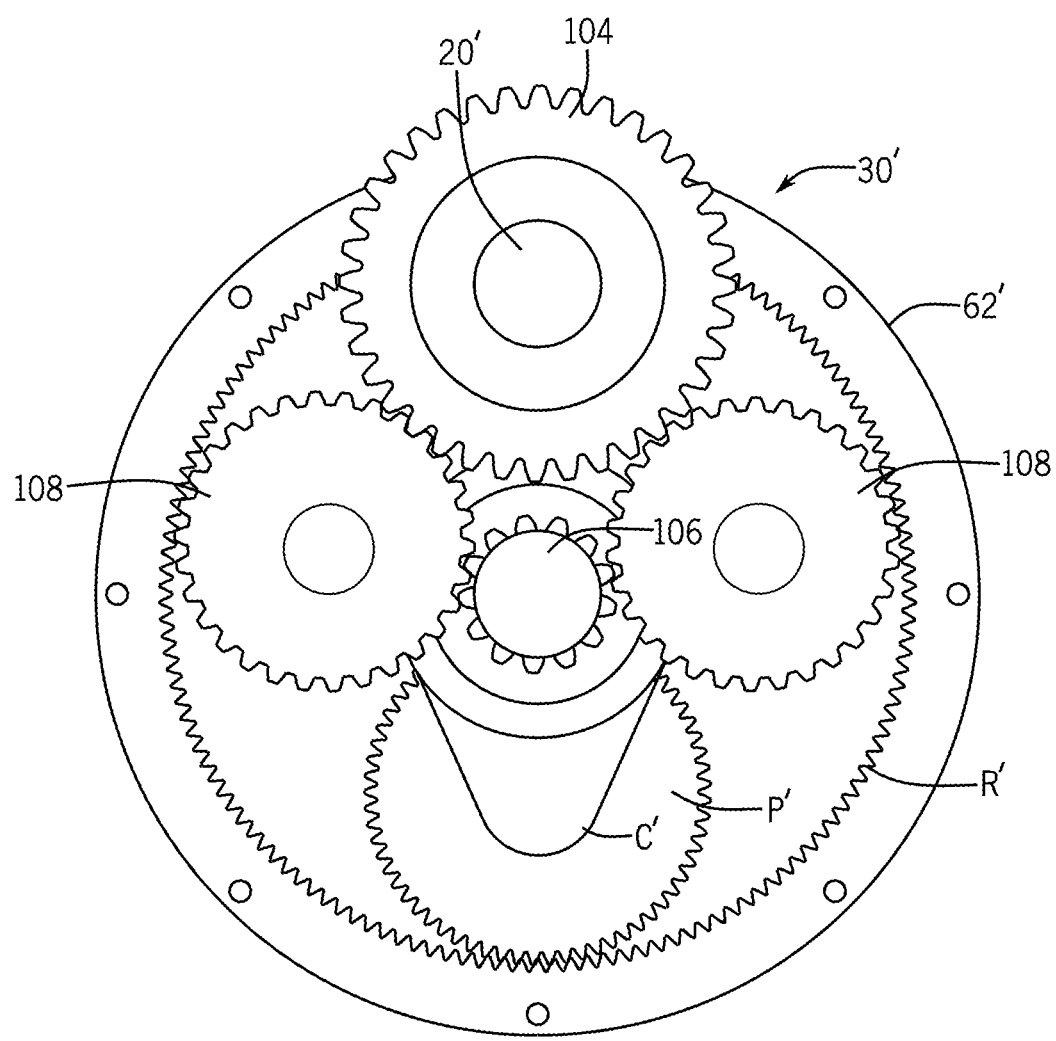
FIG. 6 is an end view showing a simplified representation of a power transmission assembly of another example starter-generator device, shown with a portion for the gear housing removed.
Figure 7:
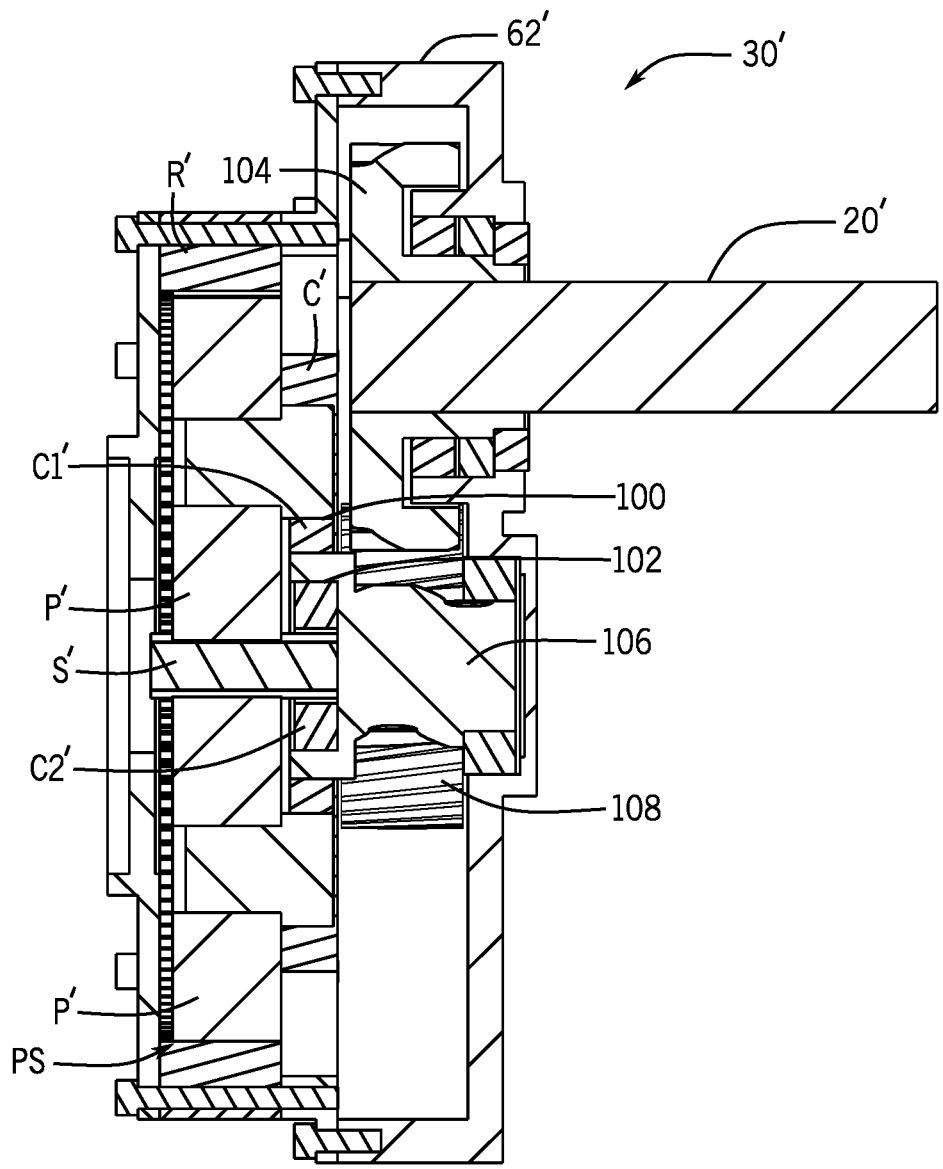
FIG. 7 is a side sectional view of the power transmission assembly for the starter-generator device of FIG. 6.

FIGS. 6 and 7 illustrate another physical implementation of the ISG device 30', which will be understood to include a transmission, an electric machine and an inverter/rectifier, that interfaces with the engine 16 and the energy storage device (i.e., battery 40), as shown in FIG. 3. The electric machine may be the same or similar to the electric machine 36, and the inverter/rectifier may be the same or similar to the I/R device 32, which may be packaged together with a gear set as a single device, including a motor within a motor casing (not shown) and a gear set within a gearbox 62'. Like the aforementioned embodiments, the gear set is coupled with torque application components (e.g., clutches) that engage to transfer torque between the gear set and the input/output shafts of the engine and the electric machine. The transmission assembly 34' includes two clutches C1' and C2', each being a passive component that does not require active control to energize. The clutches C1' and C2' are configured as one-way clutches such that they automatically engage in the direction in which power flows, that is rather than external control hardware, the ISG device 30' controls the clutches C1' and C2' internally by operation of the electric machine. Operation in one rotational direction engages the clutch C1' (and disengages the clutch C2') and vice versa with operation of the electric machine in the opposite rotational direction. Again, any known clutch configuration may be used, including, for example, roller clutches, sprag clutches, wedge clutches, and mechanical diodes. Furthermore, while the system benefits from the use of passive, one-way clutches in that external active control hardware and software may be eliminated, actively controlled torque application components (e.g., bi-directional and other clutches), and corresponding control hardware and software, may be incorporated into the ISG device 30'.

Like the previous embodiments, the ISG device 30' may be a single component package complete with the gear set, the electric machine and the I/R device (not shown). The transmission assembly 34' of the ISG device 30' has a planetary set PS including a sun gear S' meshing with two planet gears P' that revolve around the sun gear S' within a planet carrier C' and engage a ring gear R'. The over-running (one-way) clutch C1' is mounted within an outer cavity 100 of the carrier C', and the over-running clutch C2' is mounted within an inner cavity 102 of the carrier C'. The clutch C1' and C2' engage the carrier C' and the sun gear S'. The sun gear S' may be a sun shaft as shown, or may be mounted to a stub shaft, in either case, the sun gear S' may be co-axial with the electric machine shaft 38' on which the sun gear S' is mounted, and axially offset from the output shaft 20', or another shaft, that is coupled to the engine. The output shaft 20', or other shaft, may mount an output gear 104 that is coupled to a drive gear 106 by a pair of idler gears 108 of an axial gear train. The output gear 104, drive gear 106 and idler gears 108 may be journaled to the housing of the gearbox 62' via suitable bearings, bushing and the like. The drive gear 106 is coupled to, or formed integrally as a part of, the carrier C' to co-rotate therewith. The planetary set PS operates in a sun-in, carrier-out configuration during starting and in a carrier-in, sun-out configuration during power generation, with the clutches C1' and C2' automatically alternating engagement and disengagement in the two power flow directions. Thus, in a compact, unitary component package, the ISG device 30', including the example transmission assembly 34', provides a direct mechanical interface with the engine in both power flow directions.

Referring also to FIG. 8A, the power flow for engine start up is as follows. With the engine 16 inactive or stopped, activation of the ignition by an operator in the cabin 18 of the work vehicle 10 energizes the electric machine, which operates as a motor, to rotate and drive the sun gear S'. Rotation of the sun gear S' drives rotation of the planet gears P' and the carrier C'. The ring gear R' is fixed to ground, and thus the planet gears P' and the carrier C' rotates with respect to the ring gear R'. In this power flow direction, the clutch C1' is engaged to couple the carrier C' to the engine via the axial gear train, including the drive gear 106, idler gears 108, output gear 104 and output shaft 20'. Rotation of the sun gear S' and the planet gears P' rotates the carrier C'. However, the drive gear 106 rotates slower than the electric machine shaft, which keeps the clutch C2' disengaged.

Referring also to FIG. 8B, power flow transition from engine start up to power generation for the example transmission assembly 34' is as follows. As the engine 16 begins to fire and accelerates above starting speed, clutch C1' disengages. At this point, both clutches C1' and C2' are disengaged. After the engine 16 stabilizes at an idle speed or above, the electric machine 36 is allowed to slow down. The planetary set PS is configured such that once the electric machine 36 decelerates sufficiently, the clutch C2' engages to drive the electric machine 36 to operate as a generator. Specifically, the engine 16 rotates the output shaft 20' to rotate the carrier C' (via the axial gear set), which drives the planet gears P' to revolve and rotate within the fixed ring gear R' to rotate the sun gear S', which, in turn, drives the shafts of the electric machine 36. The carrier C' idles slower than the drive gear 106, which keeps the clutch C1 disengaged.

The example planetary set PS provides a deep reduction ratio many times (e.g., 10 times) higher than that of the example transmission assembly 34a, and within a similar space envelope. In the example starting load characteristics of the engine 16 mentioned above (i.e., operating speed range of about 2,000-3,000 RPM, crank speed of about 100-150 RPM, and peak starting torque of about 300 Nm), the planetary set PS of example transmission assembly 34' may be configured to provide a starting torque ratio of the carrier C' to the sun gear S' of about 3.5-4:1 and a power generating torque ratio of the sun gear S' to the carrier C' of about 75-95:1. These gear ratios may be effected, as one example, by the sun gear S' having 30 teeth, the planet gears P' having 25 teeth, and the ring gear R' having 80 teeth. The electric machine 36 may thus have normal operating speeds (e.g., about 10,000 RPM) in both power flow directions with relatively high torque output for engine start up and low torque output during power generation.

Thus, various embodiments of the vehicle electrical system have been described that include an integrated starter-generator device. Various transmission assemblies may be included in the device and packaged as a single component with the associated electric machine and inventor/rectifier, thus reducing the space occupied by the system. The transmission assembly may provide multiple speeds or gear ratios and transition between speeds/gear ratios automatically by changes in the operational direction of the electric machine. One or more passive clutch arrangements, such as over-running or one-way clutches of various configurations, may be used to selectively apply torque to the gear set of the transmission assembly in both power flow directions. Direct mechanical engagement with the engine shaft reduces the complexity and improves reliability of the system compared to belt driven systems. Using a planetary set in the transmission assembly provides high gear reduction and torque capabilities with reduced backlash in a compact space envelope.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A combination engine starter and power generator device for a work vehicle having an engine, the device comprising:
   an electric machine;
   a gear set mounted to the electric machine and configured to receive rotational input from the electric machine and from the engine and to mechanically couple the electric machine and the engine in first and second power flow directions in which in the first power flow direction the gear set effects a first gear ratio and in the second power flow direction the gear set effects a second gear ratio, wherein the gear set includes a planetary gear set having a sun gear and a carrier for one or more planet gears and includes a drive gear coupled for co-rotation with the carrier;
   a first one-way clutch that is engaged when the gear set moves in the first power flow direction and is disengaged when the gear set moves in the second power flow direction; and
   a second one-way clutch that is engaged when the gear set moves in the second power flow direction and is disengaged when the gear set moves in the first power flow direction;
   wherein the first clutch is disposed between the carrier and the drive gear and the second clutch is disposed between the sun gear and the drive gear.

2. The device of claim 1, wherein the first power flow direction is from the electric machine to the engine and the second power flow direction is from the engine to the electric machine; and
   wherein the first gear ratio is greater than the second gear ratio.

3. The device of claim 2, wherein the first gear ratio is at least 10 times the second gear ratio.

4. The device of claim 3, wherein the first gear ratio is about 40-100:1 and the second gear ratio is about 2-10:1.

5. The device of claim 1, wherein the first and second clutches are mechanically-actuated clutches.

6. The device of claim 5, wherein the one-way mechanically-actuated clutches are one or more of a sprag clutch, a roller clutch, a wedge clutch and a mechanical diode.

7. The device of claim 1, wherein the planetary gear set is a single planetary gear set including a single sun gear, a single carrier and a single ring gear.

8. The device of claim 7, wherein rotational power from the electric machine moves in the first power flow direction from the sun gear to the carrier to the engine; and
   wherein rotational power from the engine moves in the second power flow direction from the carrier to the sun gear to the electric machine.

9. The device of claim 1, wherein the gear set further includes at least one idler gear and an output gear coupled to an output shaft; and
   wherein the drive gear is coupled to the output gear through the idler gear.

10. A combination engine starter and electric power generator device for a work vehicle having an engine, the device comprising:
    a housing;
    an electric machine at least in part contained in the housing; and
    a transmission at least in part contained in the housing, the transmission including:
      a gear set configured to receive rotational input from the electric machine and from the engine and mechanically couple the electric machine and the engine in first and second power flow directions in which in the first power flow direction the gear set effects a first gear ratio and in the second power flow direction the gear set effects a second gear ratio, wherein the gear set includes a planetary gear set having a sun gear and a carrier for one or more planet gears; and
      a clutch assembly mechanically coupled to the gear set, the clutch assembly including:
        a first one-way clutch that is engaged when the gear set moves in the first power flow direction and is disengaged when the gear set moves in the second power flow direction; and
        a second one-way clutch that is engaged when the gear set moves in the second power flow direction and is disengaged when the gear set moves in the first power flow direction;
      wherein the gear set further includes a drive gear coupled for co-rotation with the carrier; and
      wherein the first one-way clutch is disposed between the carrier and the drive gear and the second one-way clutch is disposed between the sun gear and the drive gear.

11. The device of claim 10, wherein rotational power from the electric machine moves in the first power flow direction from the sun gear to the carrier to the engine; and
    wherein rotational power from the engine moves in the second power flow direction from the carrier to the sun gear to the electric machine.

12. The device of claim 11, wherein the gear set further includes an axial gear set with a drive gear, at least one idler gear, and an output gear coupled to an output shaft; and
    wherein the drive gear is coupled for co-rotation with the carrier and is coupled to the output gear through the idler gear.

13. A drivetrain assembly for a work vehicle, comprising:
    an engine; and a combination starter and generator device, the device including:

an electric machine;

a gear set mounted to the electric machine and configured to receive rotational input from the electric machine and from the engine and to mechanically couple the electric machine and the engine in first and second power flow directions in which in the first power flow direction the gear set effects a first gear ratio and in the second power flow direction the gear set effects a second gear ratio, wherein the gear set includes a planetary gear set having a sun gear and a carrier for one or more planet gears;

a first one-way clutch that is engaged when the gear set moves in the first power flow direction and is disengaged when the gear set moves in the second power flow direction; and a second one-way clutch that is engaged when the gear set moves in the second power flow direction and is disengaged when the gear set moves in the first power flow direction;

wherein the gear set further includes a drive gear coupled for co-rotation with the carrier; and wherein the first one-way clutch is disposed between the carrier and the drive gear and the second one-way clutch is disposed between the sun gear and the drive gear.

14. The drivetrain assembly of claim 13, wherein rotational power from the electric machine moves in the first power flow direction from the sun gear to the carrier to the engine; and wherein rotational power from the engine moves in the second power flow direction from the carrier to the sun gear to the electric machine.

* * * * *